United States Patent
Coan et al.

(10) Patent No.: US 12,247,548 B1
(45) Date of Patent: Mar. 11, 2025

(54) DOUBLE SET OF BLADES WIND POWERED TURBINE

(71) Applicant: Earth Friendly Energy Solutions, Inc., Oceanside, NY (US)

(72) Inventors: Ronald Coan, Oceanside, NY (US); Joseph Vuotto, Lynbrook, NY (US); Nicola Vuotto, Lynbroook, NY (US); Michael Vuotto, Hewlett, NY (US); Bogdan Wos, Centerreach, NY (US)

(73) Assignee: Earth Friendly Energy Solutions, Inc., Oceanside, NY (US)

( * ) Notice: Subject to any disclaimer, the term of this patent is extended or adjusted under 35 U.S.C. 154(b) by 0 days.

(21) Appl. No.: 18/423,853

(22) Filed: Jan. 26, 2024

(51) Int. Cl.
*F03D 3/00* (2006.01)
*F03D 3/06* (2006.01)

(52) U.S. Cl.
CPC .............. *F03D 3/009* (2023.08); *F03D 3/062* (2013.01); *F05B 2240/213* (2013.01); *F05B 2240/302* (2013.01)

(58) Field of Classification Search
CPC . F03D 3/005; F03D 3/009; F03D 3/04; F03D 3/0409; F03D 80/004; F03D 80/00; F03D 80/10; F05B 2240/213; F05B 2240/302
See application file for complete search history.

(56) References Cited

U.S. PATENT DOCUMENTS

| | | | | |
|---|---|---|---|---|
| 6,097,104 A | * | 8/2000 | Russell | F03D 9/25 |
| | | | | 290/55 |
| 9,121,384 B2 | * | 9/2015 | Lin | F03D 9/25 |
| 10,648,452 B1 | * | 5/2020 | Galstyan | F03D 3/0409 |
| 2007/0018464 A1 | * | 1/2007 | Becker | F03D 3/062 |
| | | | | 290/55 |
| 2013/0115069 A1 | * | 5/2013 | Zha | F03D 3/0409 |
| | | | | 415/191 |
| 2014/0044521 A1 | * | 2/2014 | Bae | F03B 17/063 |
| | | | | 415/165 |

* cited by examiner

*Primary Examiner* — Elton K Wong
(74) *Attorney, Agent, or Firm* — Offit Kurman; Tod A. Kupstas (57) ABSTRACT

A wind powered turbine is disclosed that comprises two concentric cylinders. The first cylinder is located within the perimeter of the second cylinder. Both the first cylinder and the second cylinder comprise a plurality of blades. The first cylinder and its blades move in response to wind activity. The second cylinder and its blades do not move when the first cylinder and its blades are moving. The curvature of the blades of the first cylinder and the curvature of the blades of the second cylinder are in different directions with respect to each other.

16 Claims, 6 Drawing Sheets

DOUBLE SET OF BLADES WIND POWERED TURBINE

TECHNICAL FIELD

The present disclosure relates to wind turbines, in particular the present disclosure relates to a double set of blades wind powered turbine.

BACKGROUND

Wind energy has long been recognized as a viable and sustainable source of power generation. The harnessing of wind energy through windmills or wind turbines dates back centuries, evolving from simple mechanical devices to sophisticated modern systems capable of generating significant electrical power.

Traditional windmills were predominantly used for mechanical tasks such as milling grain or pumping water. These early designs consisted of basic structures with rotor blades that captured the kinetic energy from wind, converting it into rotational motion to drive machinery.

Advancements in technology and engineering have led to the development of wind turbines designed specifically for electricity generation. These turbines consist of multiple components, including rotor blades, a hub, a gearbox, and a generator. As the wind turns the rotor blades, the kinetic energy is transferred to the generator through a series of mechanisms, producing electrical power.

In recent years, the demand for renewable energy sources has propelled substantial innovation in wind turbine design and efficiency. Improvements in materials, aerodynamics, control systems, and siting strategies have contributed to enhancing the performance and reliability of wind turbines, making wind power an increasingly competitive and environmentally friendly alternative to conventional energy sources.

Nevertheless, challenges persist, including noise, potential oil leaks, damage to wildlife, and size. Innovations aimed at addressing these challenges can assist in furthering the adoption and efficiency of wind-based power generation systems.

SUMMARY

An aspect of the disclosure is a turbine that uses two sets of blades to generate power.

An aspect of the disclosure is a turbine. The turbine having: a central hub forming a central axis; a first cylinder operably connected to the central pole and adapted to rotate about the central hub, wherein the first cylinder comprises a first plurality of blades wherein each of the first plurality of blades extends from a top of the first cylinder to a bottom of the first cylinder; a second cylinder surrounding the first cylinder, wherein the second cylinder comprises a second plurality of blades wherein each of the second plurality of blades extends from a top of the second cylinder to the bottom of the second cylinder; and wherein each of the first plurality of blades have a curvature that is in a direction different from curvature of the second plurality of blades.

Another aspect of the disclosure is a wind powered turbine. The wind turbine having a first cylinder surrounding a central hub forming an axis, the first cylinder adapted to rotate, wherein the first cylinder comprises a first plurality of blades wherein each of the first plurality of blades is vertically oriented and adapted to move via wind activity; a second cylinder surrounding the first cylinder, wherein the second cylinder comprises a second plurality of blades wherein each of the second plurality of blades is vertically oriented and adapted to not move via wind activity; and wherein each of the first plurality of blades have a curvature that is in a direction different from curvature of the second plurality of blades.

BRIEF DESCRIPTION OF THE DRAWINGS

The foregoing summary, as well as the following detailed description of illustrative embodiments of the present application, will be better understood when read in conjunction with the appended drawings. For illustrating the present application, shown in the drawings are embodiments of the disclosure. It should be understood, however, that the application is not limited to the precise arrangements and instrumentalities shown.

DETAILED DESCRIPTION OF ILLUSTRATIVE EMBODIMENTS

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art.

The components described hereinafter as making up the various embodiments are intended to be illustrative and not restrictive. Many suitable components that would perform the same or a similar function as the components described herein are intended to be embraced within the scope of embodiments of the present disclosure.

A wind turbine operates as a renewable energy source by tapping into the kinetic energy present in the wind. Its functionality commences when the turbine's blades intercept the incoming wind, thereby initiating their rotational movement about a hub. This rotational force propels a central hub referred to as the rotor. Attached to this rotor is a shaft that transfers the rotational energy to a gearbox, which amplifies the speed to a level suitable for electricity generation. The high-speed shaft then links to a generator housed within a nacelle positioned atop or at the bottom the tower. Inside the generator, the mechanical energy is transformed into electrical energy using electromagnetic induction, achieved through the interaction of magnets and conductive wire coils.

Subsequently, the electricity produced is conveyed through cables running within the tower and directed through a transformer that elevates its voltage before integrating it into a battery or the larger electrical grid. To optimize energy capture, many wind turbines feature a yaw system that adjusts their orientation, ensuring they constantly face the wind direction. This system is supported by advanced sensors and control mechanisms that regulate the turbine's functions. Moreover, these turbines are equipped with braking systems designed to manage rotor speed during high wind conditions or for maintenance purposes, ensuring safe and efficient operations.

Wind turbines are instrumental in generating sustainable electricity by harnessing wind power and converting it into a dependable source of renewable energy. Their design and operation involve a complex interplay of components all working in tandem to transform wind energy into usable electricity for widespread consumption and a greener future.

Figure 1:
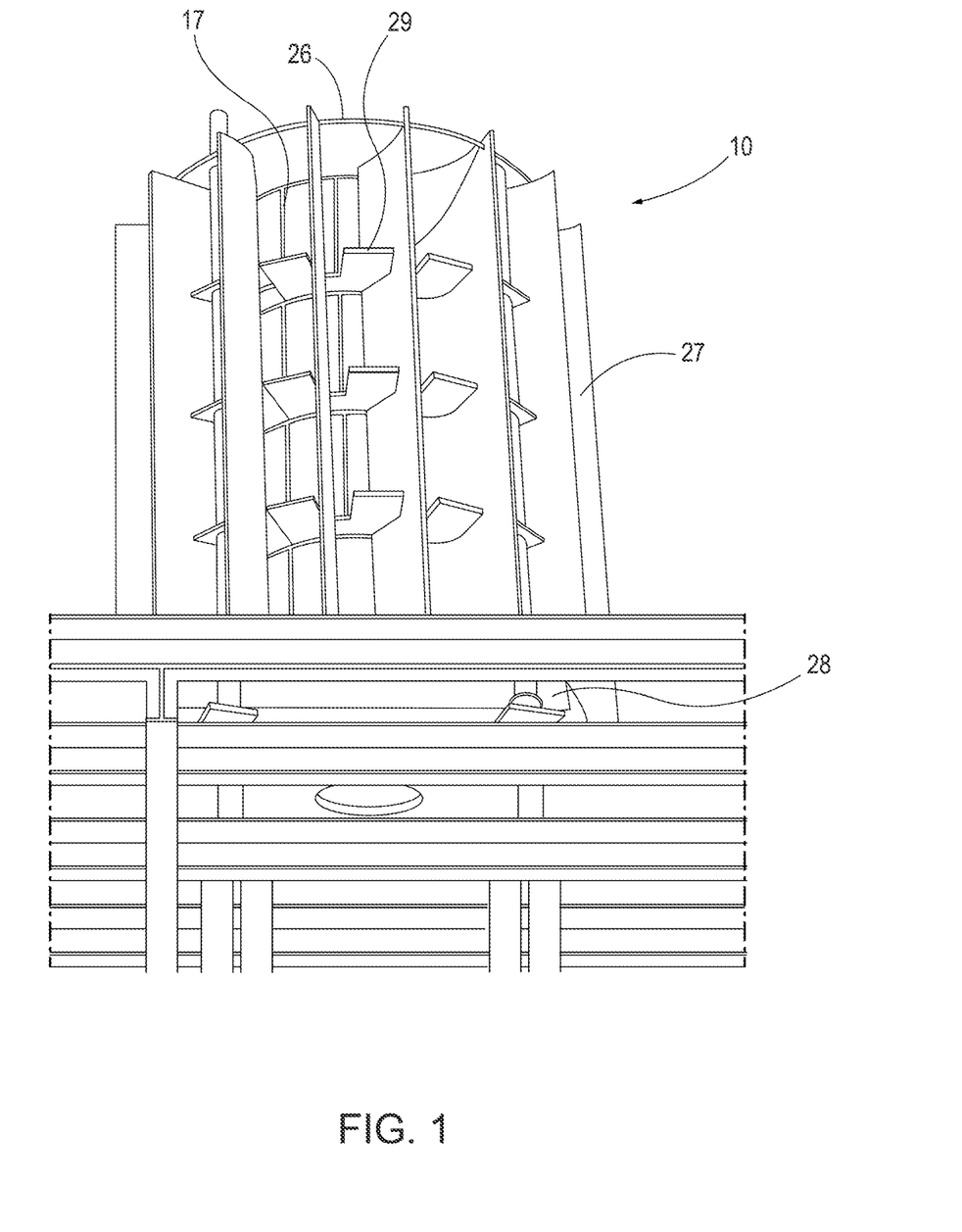
FIG. 1 is a view of the double set of blades turbine.
Figure 2:
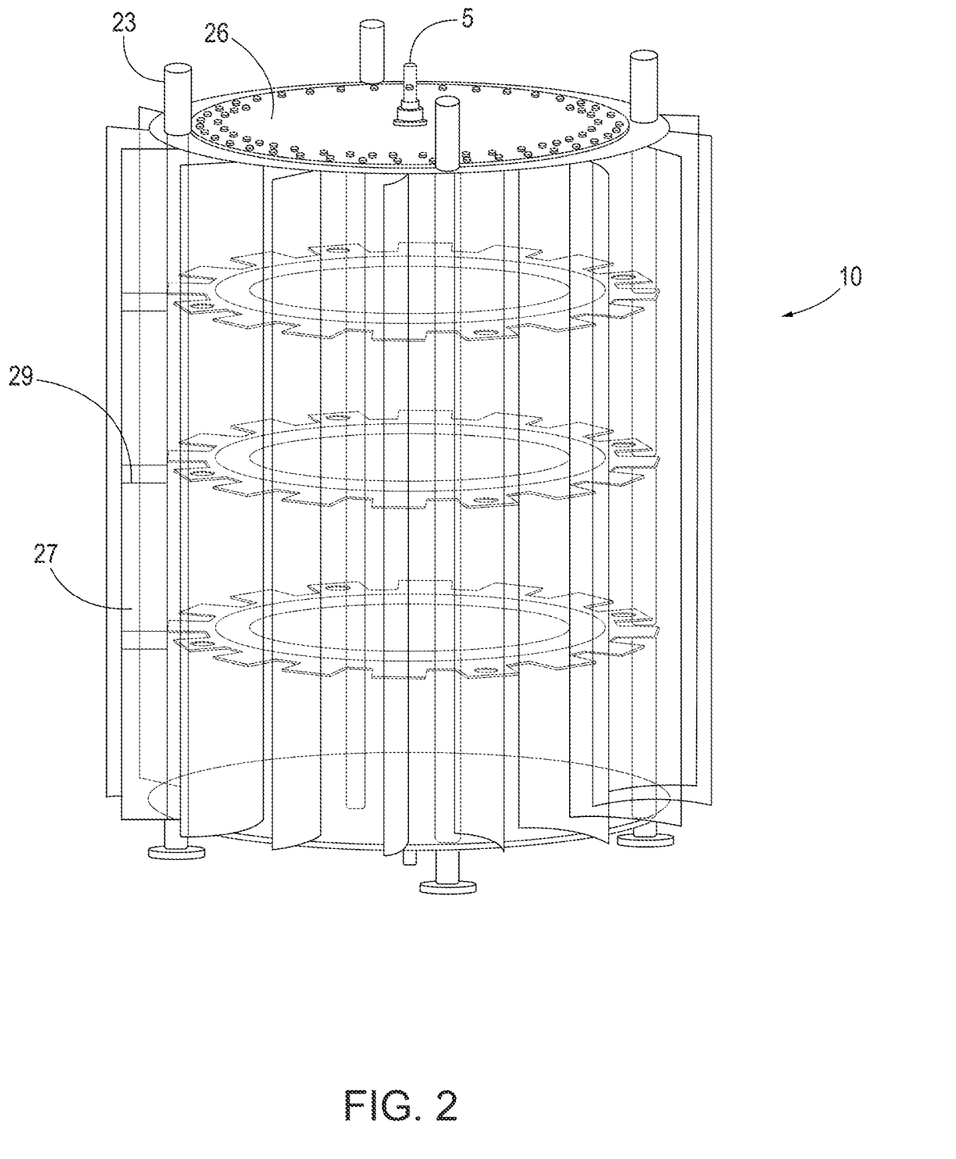
FIG. 2 is perspective view of the double set of blades turbine shown in FIG. 1.
Figure 3:
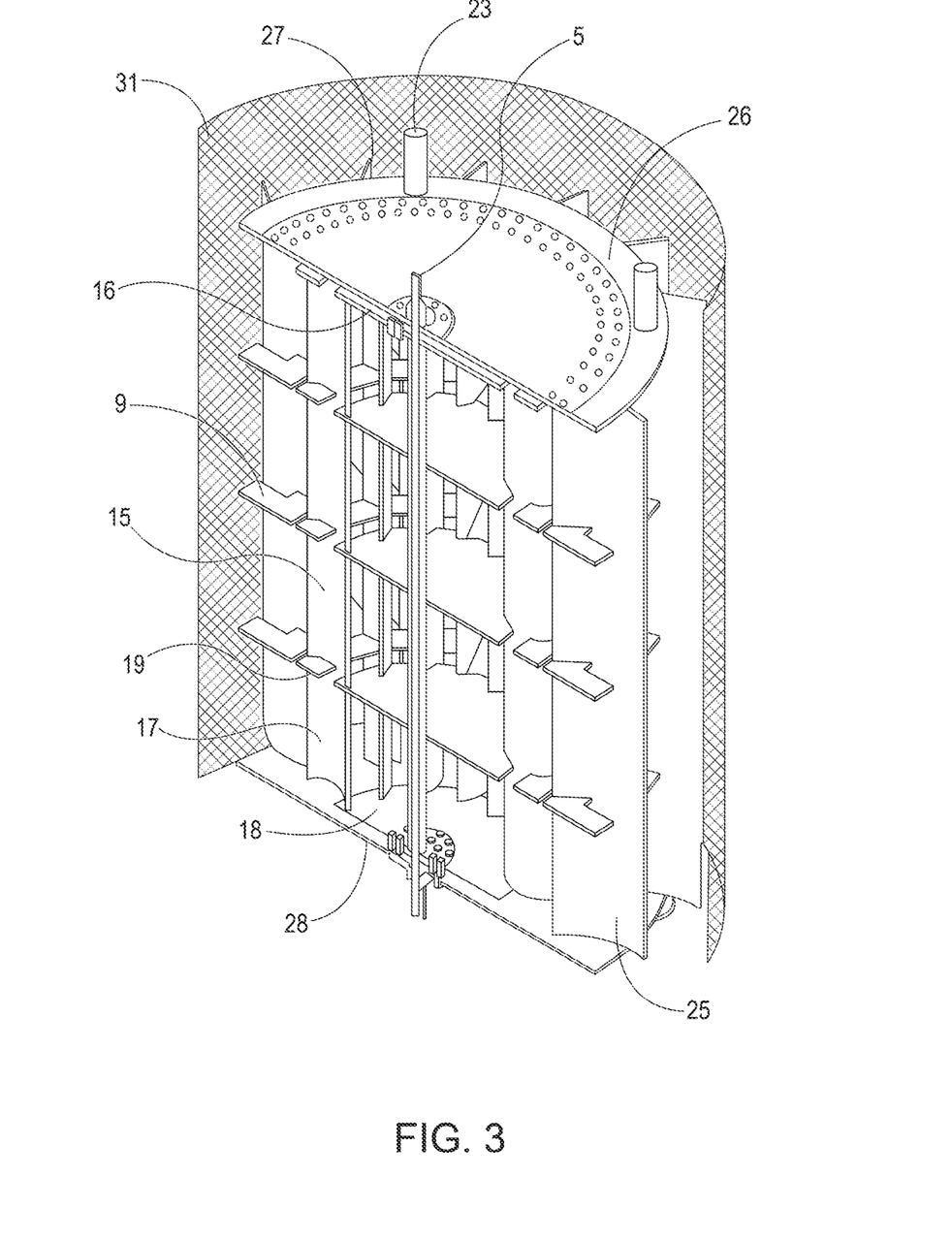
FIG. 3 is a cross-sectional view of the double set of blades turbine shown in FIG. 1.

Turning to FIGS. 1-3, shown is a more compact, quiet, environmentally friendly wind-powered turbine 10. FIG. 1 is a view of the double set of blades turbines 10. FIG. 2 is perspective view of the double set of blades turbines 10. FIG. 3 is a cross-sectional view of the double set of blades turbines 10.

Still referring to FIGS. 1-3, turbine 10 comprises a first cylinder 15 and a second cylinder 25 that are nested within each other. The first cylinder 15 and the second cylinder 25 are concentric with each other about a central hub 5. The first cylinder 15 comprises a plurality of first blades 17. The second cylinder 25 comprises a plurality of second blades 27.

The structural components forming the turbine 10 may be formed from fiberglass, fiberglass reinforced with epoxy or polyester resin, carbon fiber, wood, steel, steel alloys, aluminum, aluminum alloys, cast iron, and ceramic materials.

The first cylinder 15 comprises a first top portion 16, a first bottom portion 18, a plurality of first blades 17, and first support rings 19. The first top portion 16 is disc shaped. The disc-shaped first top portion 16 may be constructed of metal and each end of the plurality of first blades 17 is welded to the first top portion 16 and the first bottom portion 18. In an embodiment, the first blades 17 may be attached via bolts devices to the first top portion 16 and the first bottom portion 18. In an embodiment, the first blades 17 may be attached via screws, or other attachment devices to the first top portion 16 and the first bottom portion 18.

Both the first top portion 16 and the first bottom portion 18 are attached to the central hub 5. As the force of wind, or other source of atmospheric activity, acts on the first blades 17, the first top portion 16 and the first bottom portion 18 begin to rotate about the central hub 5. The rotation of the central hub 5 is used to ultimately generate electricity by translating that movement via gears (not shown) to a generator (not shown). Sealed bearings (not shown) are used proximate to the top and bottom of the central hub 5. The sealed bearings permit rotation of the central hub 5 in manner that does not necessitate additional oil being applied.

Figure 6:
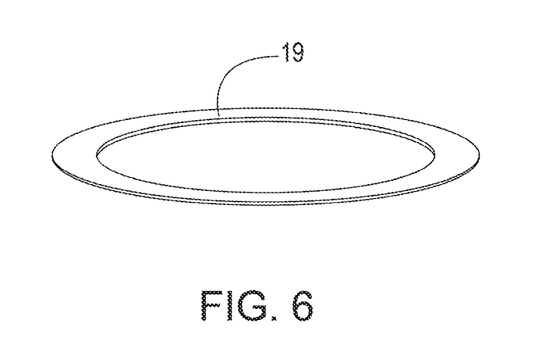
FIG. 6 shows a top-down perspective view of the second cylinder support ring.

In an embodiment, the first blades 17 are additionally operably connected to the first support rings 19 (also shown in FIG. 6). The first support rings 19 help support the first blades 17 as the first blades 17 move and drive the rotation of the central hub 5. The first blades 17 are oriented so that the longer dimension (the length) of the blades is vertically oriented between the first top portion 16 and the first bottom portion 18.

Each of the first blades 17 is curved and spaced apart from each other of the first blades 17 located around the perimeter of the first cylinder 15. In an embodiment each of the first blades 17 is equidistantly spaced from each other of the first blades 17. In an embodiment, the spacing of the first blades 17 is not equidistant with respect to each other of the first blades 17. In an embodiment, the spacing of the first blades is both equidistant and variable with respect to each other of the first blades 17.

In an embodiment there are sixteen first blades 17 spaced around the first cylinder 15. In an embodiment, there are eight first blades spaced around the first cylinder 15. In an embodiment, there are between one and twenty first blades 17 spaced around the first cylinder 15. It should be understood that the number of first blades 17 used in the formation of the first cylinder 15 can vary depending on the size, preferred spacing, and needs of the turbine 10.

In an embodiment, the curvature of each of the first blades 17 forms an arc that is about 150°. In an embodiment, the curvature of each of the first blades 17 forms an arc that is between 115° and 165°. In an embodiment, the curvature of each of the first blades 17 is not the same. In an embodiment, the curvature of some of the first blades 17 is not the same as the curvature from some of the other first blades 17.

The second cylinder 25 comprises a second top portion 26, a second bottom portion 28, a plurality of second blades 27, and second support rings 29. The second top portion 26 is disc shaped. The disc-shaped second top portion 26 may be constructed of metal and each end of the plurality of second blades 27 is welded to the second top portion 26 and the second bottom portion 28. In an embodiment, the second blades 27 may be attached via bolts, screws, or other attachment devices to the second top portion 26 and the second bottom portion 28.

Figure 5:
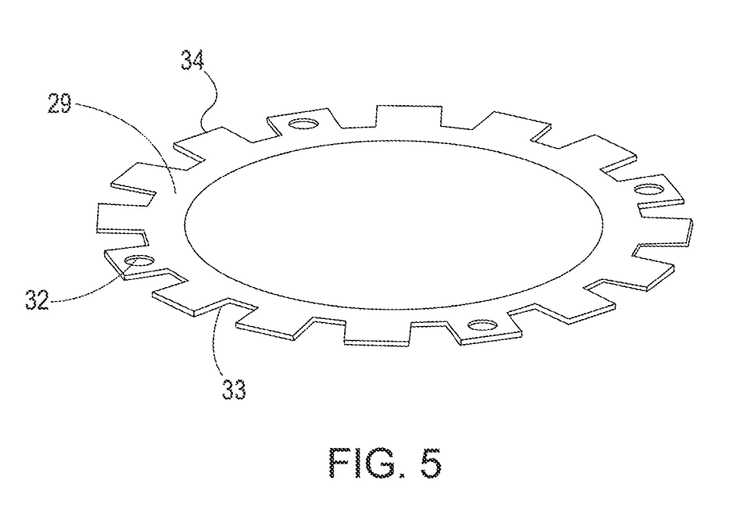
FIG. 5 shows a top-down perspective view of the first cylinder support ring.

In an embodiment, the second blades 27 are additionally connected to the second support rings 29 (also shown in FIG. 5). The second support rings 29 help support the second blades 27 as. The second blades 27 are oriented so that the longer dimension (the length) of the blades is vertically oriented between the second top portion 26 and the second bottom portion 28.

Additionally, support bars 23 form part of the second cylinder 25 in order to provide additional support for the second blades 27 and the second top portion 26 and the second bottom portion 28, as well as the overall structure of the turbine 10. In the embodiment shown in FIGS. 1-4, there are four support bars 23 that provide support for the second cylinder 25. The four support bars 23 extend vertically between the second top portion 26 and the second bottom portion 28. The four support bars 23 anchor the turbine 10 in place by enabling each support bar 23 to further support the turbine 10. Each of the four support bars 23 is located in a different quadrant of the second cylinder 25. In an embodiment, there may be three support bars 23 equidistantly spaced. In an embodiment, there may be two support bars 23 equidistantly spaced.

Each of the second blades 27 is curved and spaced apart from each other of the second blades 27 located around the perimeter of the second cylinder 25. In an embodiment each of the second blades 27 is equidistantly spaced from each other of the second blades 27. In an embodiment, the spacing of the second blades 27 is not equidistant with respect to each other of the second blades 27. In an embodiment, the spacing of the second blades 27 is both equidistant and variable with respect to each other of the second blades 27. The second blades 27 are stationary with respect to each other during wind activity. The second blades 27 guide the direction of the wind from the second cylinder 25 inwards towards the first cylinder 15.

In an embodiment there are sixteen second blades 27 spaced around the second cylinder 25. In an embodiment, there are eight first blades spaced around the second cylinder 25. In an embodiment, there are between one and twenty second blades 27 spaced around the second cylinder 25. It should be understood that the number of second blades 27 used in the formation of the second cylinder 25 can vary depending on the size, preferred spacing, and needs of the turbine 10.

In an embodiment, the curvature of each of the second blades 27 forms an arc that is about 130°. In an embodiment, the curvature of each of the second blades 27 forms an arc that is between 110° and 175°. In an embodiment, the curvature of each of the second blades 27 is not the same. In an embodiment, the curvature of some of the second blades 27 is not the same as the curvature from some of the other first blades 27. The curvature of the second blades 27 is in the opposite direction from the curvature of the first blades 17. The curvature of the second blades 27 is in a clockwise direction when looking top-down on the turbine 10, while the curvature of the first blades 17 is counter-clockwise when looking top-down on the turbine 10. The curvature of the first blades 17 and the second blades 27 is controlled by the overall size of the unit.

FIG. 3 shows screen 19 that is able to be placed around the perimeter of the second cylinder 25. The screen 19 is placed around the second cylinder 25 in order to prevent birds and other animals from coming into contact with the internal workings of the turbine 10. The screen 19 permits air activity to come into contact with the second blades 27 and the first blades 17, while still being able to prevent birds and other animals from coming into contact with the turbine 10. The screen 19 further prevents debris from entering the turbine 10.

In an embodiment, the screen 19 is a type of netting or galvanized mesh able to be replaced with routine maintenance. In an embodiment, the screen 19 is made of metal. In an embodiment, the screen 19 is made of fabric. In an embodiment, the screen 19 is made of plastic. In an embodiment, the screen 19 is made of acrylic. In an embodiment, the screen 19 is made of plexiglass. In an embodiment, the screen 19 is made of natural material, such as wood or bamboo.

FIG. 5 shows the second support ring 29. The second support ring 29 provides structural support for the second blades 27. The second support ring 29 has a plurality of notches 33 located around the perimeter of the second support ring 29. Each of the plurality of notches 33 is formed between each projection 34 of the second support ring 29. Each of the projections 34 have a rectangular shape. In the embodiment shown in FIG. 5, four of the projections 34 has a support bar hole 32. The support bar holes 32 permit passage of the support bars 23 and provide additional support for the second cylinder 25.

In the embodiment shown in FIG. 5, each of the notches 33 has a trapezoidal shape that is adapted to support second blades 27 and its respective curvature. In an embodiment, the number of notches 33 correspond to the number of second blades 27 that are used.

Figure 4:
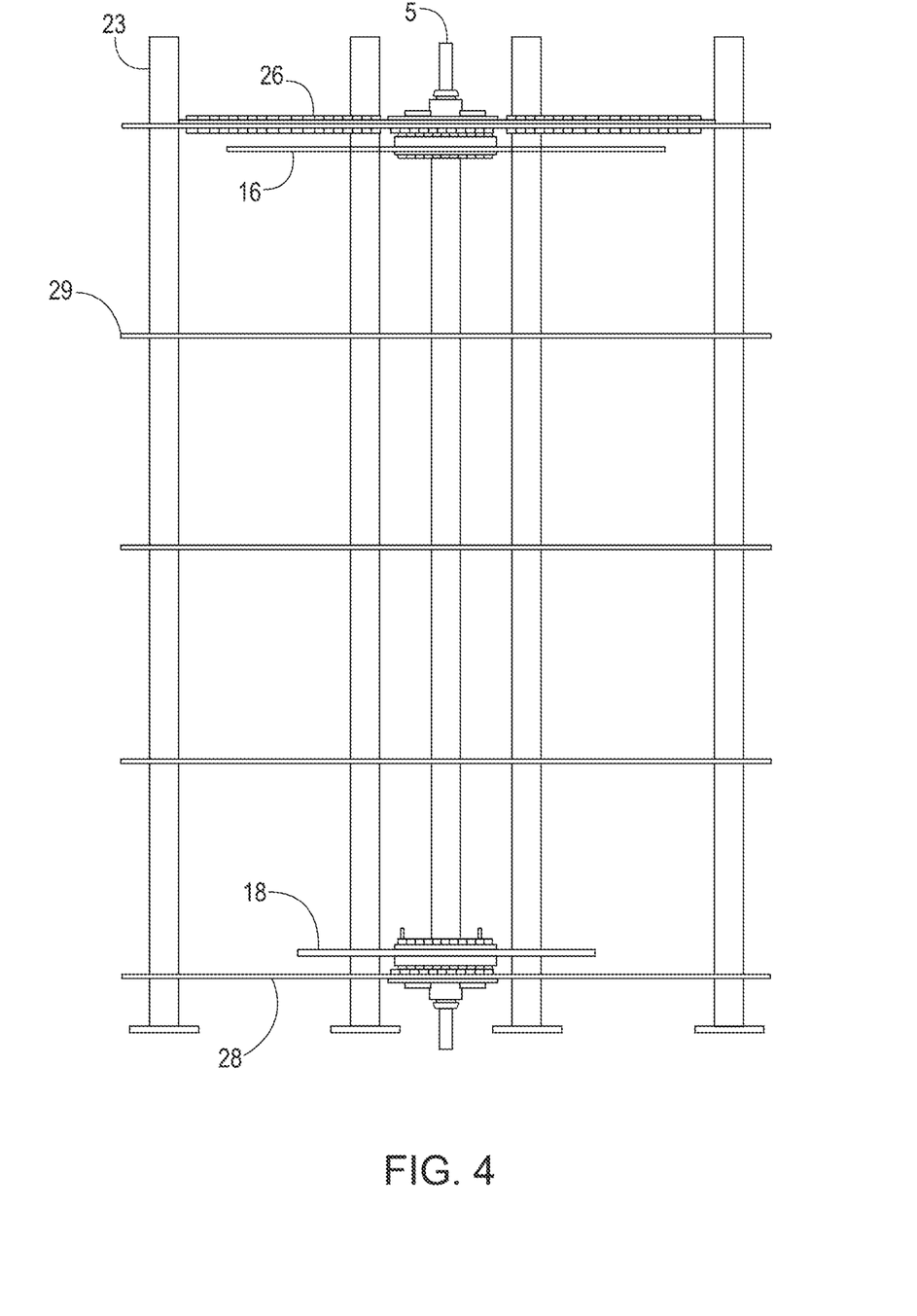
FIG. 4 shows the interior framework of the double set of blades turbine shown in FIG. 1.

Referring to FIGS. 4 and 6, FIG. 6 shows first support ring 19. First support ring 19 is adapted to support first blades 17 as the force of wind, or other source of atmospheric activity, acts on the first blades 17. First support ring 19 assists in stabilizing the structure of the first cylinder 15 as it rotates about the central hub 5. In an embodiment, there are more than one first support rings 19. Each of the first support rings 19 are parallel with each other of the first support rings 19.

Figure 7:
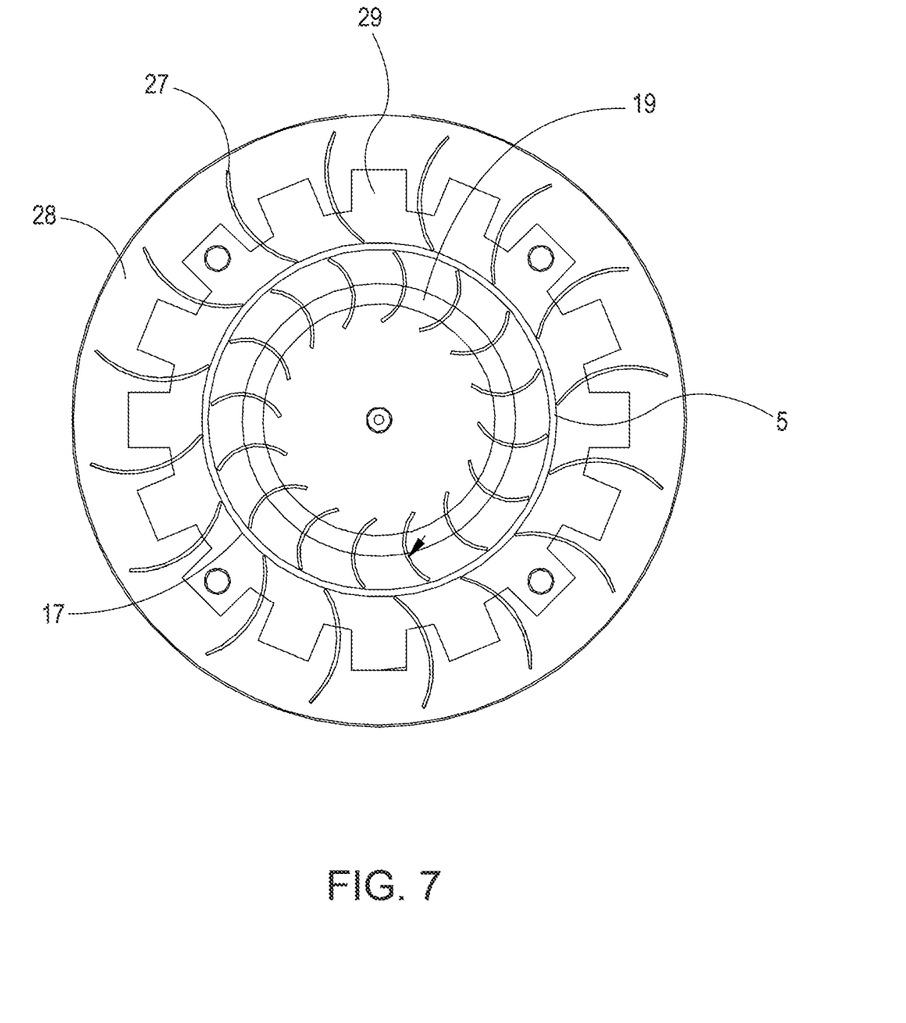
FIG. 7 is a cross-sectional view of the double set of blades turbine taken through the center portion of the two cylinders.

FIG. 7 shows a cross-sectional view of the turbine 10, with the cut taken through the center portion of the first cylinder 15 and the second cylinder 25. The orientation of the first blades 17 and the second blades 27 can be seen in this view. The curvature of the second blades 27 is in an opposite direction with respect to the curvature of the first blades 17.

As discussed above, the second blades 27 remain stationary while the first blades 17 move when impacted with atmospheric force, such as wind. The position of the second blades 27 guide wind from the second cylinder 25 towards the first cylinder 15 and the center of the turbine 10. The second blades 27 amplify the movement and direction of the wind so that the impact of the wind on the first blades 17 is greater than if the wind impacted on the first blades 17 without the presence of the second blades 25.

As shown in FIG. 7, the spacing of each the second blades 27 with respect to each other of the second blades 27 around the perimeter of the second cylinder 25 is greater than the spacing of each of the first blades 17 with respect to each other of the first blades 17. The distance around the perimeter of the first cylinder 15 between each of the first blades 17 is not as great as the distance between each of the second blades 27 around the perimeter of the second cylinder 25.

In the embodiment shown in FIG. 7, the first cylinder 15 and the second cylinder 25 have an equal number of blades. While an equal number of blades are shown in FIG. 7, it is possible use different numbers of blades for each of the cylinders. When using different numbers of blades, the spacing of blades around each of the cylinders will vary depending on the number. The number and spacing of blades around each of the perimeters will impact the force of wind on the blades and ultimately the power that is generated by the turbine.

Additionally, the respective curvature of the first blades 17 with respect to the curvature of the second blades 27 also impacts the speed with which the first blades 17 are able to move around the center hub 5 and ultimately the amount of energy that is generated. In an embodiment, the curvature of the first blades 17 is the same as the curvature of the second blades 27. In an embodiment, the curvature of the first blades 17 is different than the curvature of the second blades 27.

In an embodiment, the turbine 10 has heat strips located thereon (not shown). The heat strips are located at spots where freezing may occur. The heat strips can be powered by the electricity generated by the turbine 10. This prevents freezing from occurring.

While the disclosure is described herein, using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in an order as desired.

The invention claimed is:
1. A turbine comprising:
a center hub forming a central axis;
a first cylinder operably connected to the center hub and adapted to rotate about the center hub, wherein the first cylinder comprises a first plurality of blades wherein each of the first plurality of blades extends from a top of the first cylinder to a bottom of the first cylinder, wherein the first cylinder comprises a plurality of first support rings;
a second cylinder surrounding the first cylinder, wherein the second cylinder comprises a second plurality of blades wherein each of the second plurality of blades extends from a top of the second cylinder to the bottom of the second cylinder;

wherein each of the first plurality of blades have a curvature that is in a direction different from curvature of the second plurality of blades; and wherein the second cylinder has at least three second support rings and each of the second support rings have rectangular shaped projections spaced around a perimeter of the second support ring with notches formed between each rectangular shaped projection, wherein each of the second blades are located within a notch of the second support ring with one blade per notch.

2. The turbine of claim 1, wherein the curvature of each blade of the first plurality of blades is in a first direction and the curvature of each blade in the second plurality of blades is in a second direction opposite to the first direction.

3. The turbine of claim 1, wherein the second cylinder is adapted to not rotate when the first cylinder is rotating.

4. The turbine of claim 1, further comprising a screen encircling the second cylinder.

5. The turbine of claim 1, further comprising sealed bearings located at the top of the first cylinder and the bottom of the first cylinder.

6. The turbine of claim 1, wherein each of the plurality of first support rings are parallel with each other of the plurality of first support rings.

7. The turbine of claim 6, further comprising at least two support bars located within second support rings located in the second cylinder.

8. The turbine of claim 7, wherein the support bars extend parallel to the central hub.

9. A wind-powered turbine comprising:
a first cylinder surrounding a central hub forming an axis, the first cylinder adapted to rotate, wherein the first cylinder comprises a first plurality of blades wherein each of the first plurality of blades is vertically oriented and adapted to move via wind activity, wherein the first cylinder comprises a plurality of first support rings;

a second cylinder surrounding the first cylinder, wherein the second cylinder comprises a second plurality of blades wherein each of the second plurality of blades is vertically oriented and adapted to not move via wind activity;

wherein each of the first plurality of blades have a curvature that is in a direction different from curvature of the second plurality of blades; and wherein the second cylinder has at least three second support rings and each of the second support rings have rectangular shaped projections spaced around a perimeter of the second support ring with notches formed between each rectangular shaped projection, wherein each of the second blades are located within a notch of the second support ring with one blade per notch.

10. The wind-powered turbine of claim 9, wherein the curvature of each blade of the first plurality of blades is in a first direction and the curvature of each blade in the second plurality of blades is in a second direction opposite to the first direction.

11. The wind-powered turbine of claim 9, wherein the second cylinder is adapted to not rotate when the first cylinder is rotating.

12. The wind-powered turbine of claim 9, further comprising a screen encircling the second cylinder.

13. The wind-powered turbine of claim 9, further comprising sealed bearings located at the top of the first cylinder and the bottom of the first cylinder.

14. The wind-powered turbine of claim 9, wherein each of the plurality of first support rings are parallel with each other of the plurality of first support rings.

15. The wind-powered turbine of claim 9, further comprising at least two support bars.

16. The wind-powered turbine of claim 15, wherein the support bars extend parallel to the central hub.

\* \* \* \* \*